(12) United States Patent
Gregory et al.

(10) Patent No.: US 6,212,876 B1
(45) Date of Patent: Apr. 10, 2001

(54) SIMPLIFIED HIGH-EFFICIENCY PROPULSION SYSTEM

(76) Inventors: Roger Everett Gregory, 541A Presidio Blvd., San Francisco, CA (US) 94129; James Allen Bowery, 1180 Lochinvar No. 90, Sunnyvale, CA (US) 94087

( * ) Notice: Subject to any disclaimer, the term of this patent is extended or adjusted under 35 U.S.C. 154(b) by 0 days.

(21) Appl. No.: 09/312,585

(22) Filed: May 14, 1999

(51) Int. Cl.[7] .................................................. F02K 1/00
(52) U.S. Cl. ................................................. 60/201; 60/211
(58) Field of Search ........................... 60/201, 257, 258, 60/259, 260, 211

(56) References Cited

U.S. PATENT DOCUMENTS

| | | | |
|---|---|---|---|
| 2,516,462 | * 7/1950 | Goddard | 60/201 |
| 2,519,878 | * 8/1950 | Bjork et al. | 60/201 |
| 2,523,011 | * 9/1950 | Goddard | 60/201 |
| 2,536,599 | * 1/1951 | Goddard | 60/201 |
| 3,553,964 | * 1/1971 | Hircher III | 60/260 |

* cited by examiner

Primary Examiner—Charles G. Freay
(74) Attorney, Agent, or Firm—Klarquist Sparkman Campbell Leigh & Whinston, LLP

(57) ABSTRACT

A simplified rocket engine a rocket engine has a rotor assembly with an ultracentrifugal (over 200 meters/second tangential velocity) liquid pump arranged around a combustion chamber so as to provide both forced convective and Coriolis-effect and centripetal-acceleration enhanced free convective regenerative cooling to the combustion chamber while pressurizing the liquid propellant. Both fuel and oxidizer may be stored a cryogenic temperatures and pumped around the combustion chamber for regenerative cooling. The combustion chamber may be structured to rotate together with the pump to provide Coriolis-effect and centripetal-acceleration enhanced combustion. The rotor assembly is driven directly by a tangential component of the primary thrust vector by means of tilted nozzles or by vanes, flutes, or other reaction surfaces. Liquid oxygen and liquid propane, maintained at about the same temperature and pressure, may be used as propellant and coolant, and may be stored in polyethylene terephthalate (PET) or other polymer tankage.

16 Claims, 3 Drawing Sheets

SIMPLIFIED HIGH-EFFICIENCY PROPULSION SYSTEM

FIELD

The present invention relates to high-efficiency, low complexity, chemical, liquid-fueled rocket propulsion systems.

BACKGROUND

One characterization of the efficiency of a rocket propelled vehicle, particularly one having a chemical propulsion system, is the mass ratio MR of the vehicle defined as the final mass of the vehicle (after propellants are consumed) over the initial mass of the vehicle (before propellants are consumed). The higher the MR, the more total vehicle and payload mass are carried by a unit of propellant, and the less propellant is used merely to carry later-consumed propellant. For a given MR, the proportion of the final vehicle mass available for payload may be increased by weight reduction techniques in the non-payload components, such as use of composite materials and the like.

MR itself can be improved by staging, which allows portions of the system no longer useful to be discarded so that later stages accelerate a smaller total mass. Staging adds significantly to the complexity of a propulsion system, however.

MR may also be improved by increasing the specific impulse ($I_{SP}$) of a propulsion system, with $I_{SP}$ defined as the pounds of thrust divided by the mass flow rate in pounds per second of propellant exhaust flowing from the engine of the system, or as the seconds of pounds of thrust per pound of propellant materials. MR increases exponentially as a function of $I_{SP}$. Simply put, the longer and larger the thrust provided from a given weight of propellant, the more propellant energy is available to accelerate the payload and other system components. The Isp of a system can be improved in various ways, including increasing the exhaust velocity of the system such as by increasing the reaction temperature and/or pressure, and increasing the completeness of the reaction of the propellant substance(s). All such improvements should be achieved with minimum added weight, however, or even with weight reduction, if possible.

Liquid fueled rocket propulsion systems generally require some means of delivering propellant to a thrust chamber under pressure. Stored pressurized gas may be used to drive propellant to the thrust chamber (known as a "blowdown system"), but the storage and handling systems for the gas take up valuable space and weight allotments. The required mass of the propellant tankage is proportional to the pressure applied to the propellant, which must exceed the chamber pressure of the engine. Since high chamber pressures are required for maximum $I_{SP}$, such systems are penalized by the increased tankage mass. One or more pumps may be used to pressurize the propellant, but weight must be minimized and efficiency maximized. Such pumps require energy, in most advanced engines this is provided by turbines powered by the fuel and oxidizer, through combustion or as a byproduct of heating through regenerative cooling.

Rocket propulsion systems that are intended to operate continuously for significant lengths of time further require cooling of the combustion chamber and thrust nozzle. Such cooling should be performed as efficiently as possible with a minimum consumption of energy and/or propellant.

SUMMARY

The present invention provides a greatly simplified, efficient liquid-fueled rocket propulsion system. The system includes a rocket engine having a rotor assembly with an ultracentrifugal (over 200 meters/second tangential velocity) liquid pump arranged around a combustion chamber so as to provide both forced convective and Coriolis-effect and centripetal-acceleration enhanced free convective regenerative cooling to the combustion chamber while pressurizing the liquid propellant. Both fuel and oxidizer may be stored at cryogenic temperatures and pumped around the combustion chamber for regenerative cooling. The combustion chamber may be structured to rotate together with the pump to provide Coriolis-effect and centripetal-acceleration enhanced combustion. The rotor assembly is driven directly by a tangential component of the primary thrust vector by means of tilted nozzles or by vanes, flutes or other reaction surfaces. Liquid oxygen and liquid propane, liquid methane or another thermally compatible fuel, maintained at about the same temperature and pressure, may be used as both propellant and coolant, and may be stored in polyethylene terephthalate (PET) or other polymer tankage. The rotor assembly may be the only moving part of the engine, and may comprise the combined functionality of combustion chamber, turbine, pump, and cooling channels, and may desirably be rotated at the highest possible speed to obtain the highest feasible pressures.

This engine is desirably of the plug or aerospike variety, and can be combined with a conventional bell nozzle of various geometries to give proper expansion ratios for the exhaust gasses.

DETAILED DESCRIPTION

Figure 1:
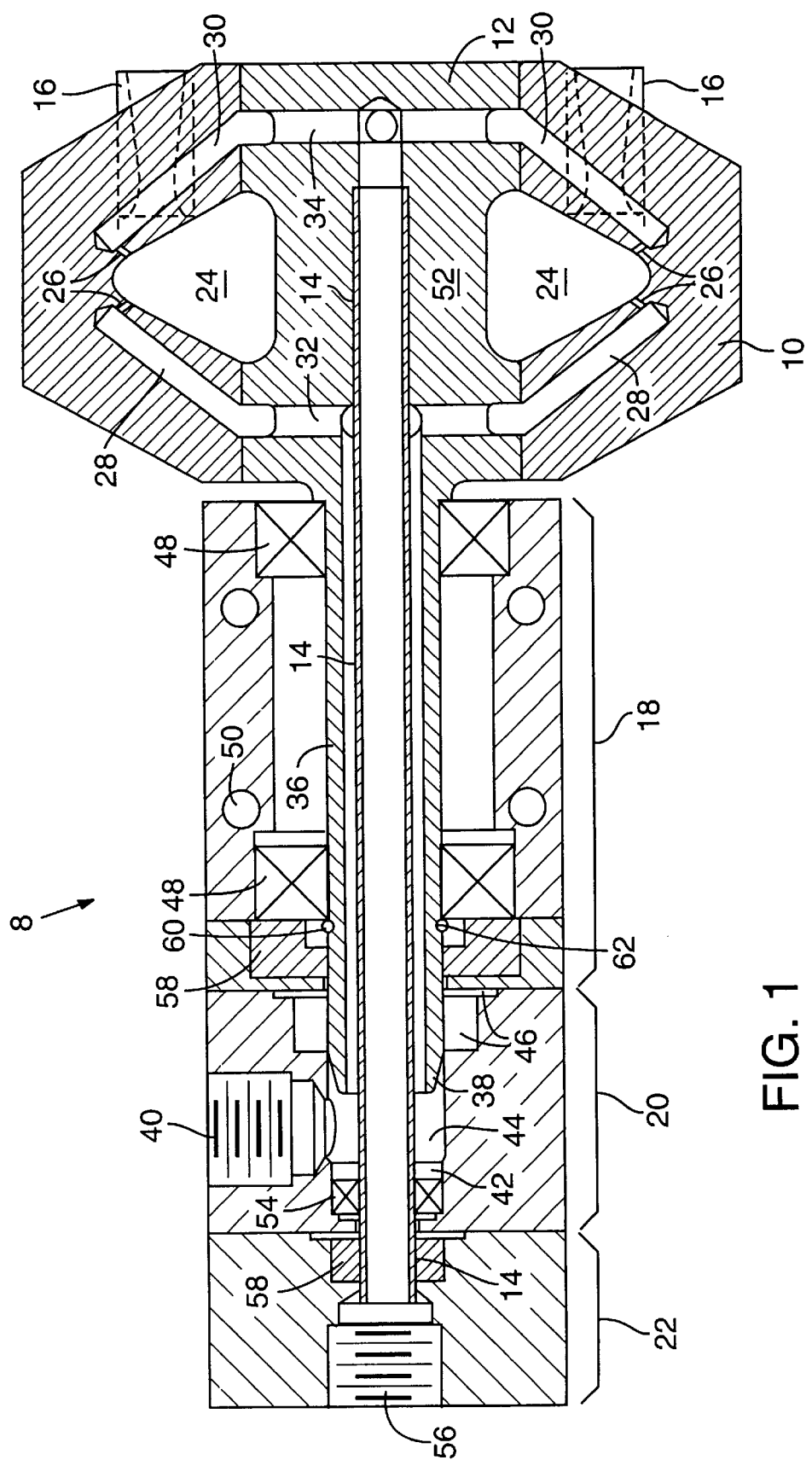
FIG. 1 is a schematic cross section of an embodiment of a rocket engine according to one embodiment of the present invention.

FIG. 1 shows a schematic cross-section of an example embodiment of a rocket engine 8 according to the present invention.

The engine of FIG. 1 includes a rotor assembly comprising a rotor 10, a spindle 12, and a feed pipe 14. The feed pipe 14 is fixed inside the center bore of a spool portion 52 of the spindle 12, concentric with the axis of the spindle 12, and extends outward from the spindle 12 beyond an end 38 of an extended portion 36 of the spindle 12. The rotor assembly is supported on the extended portion 36 of the spindle 12 by bearings 48 in a bearing block 18. Bearings 48 may be anti-friction bearings, or hydrodynamic fluid bearings may be used if desired. Seal 58 and retaining ring 60 mating with groove 62 cooperate with bearings 48 to support and retain the rotor assembly in the bearing block 18. The feed pipe 14 is additionally supported by a bearing 54 in a fuel feed block 20 fixed to the bearing block 18.

The rotor assembly defines, between an inner surface of the rotor 10 and an outer surface of the spool portion 52 of the spindle 12, an annular combustion chamber 24. The rotor 10 comprises nozzles 16 that each provide fluid communication from the combustion chamber 24 to the exterior of the engine 8. The rotor 10 further comprises injectors 26, in fluid communication with the combustion chamber 24, for injecting propellant in the form of fuel and oxidizer into the combustion chamber 24. The rotor 10 also comprises impeller passages 28 and 30, in fluid communication with circumferential fluid passages 32 and 34, respectively, in the spool portion 52 of the spindle 12, and with the injectors 26, for impelling fuel and oxidizer from the circumferential fluid passages 32 and 34 toward and through the injectors 26.

Figure 2:
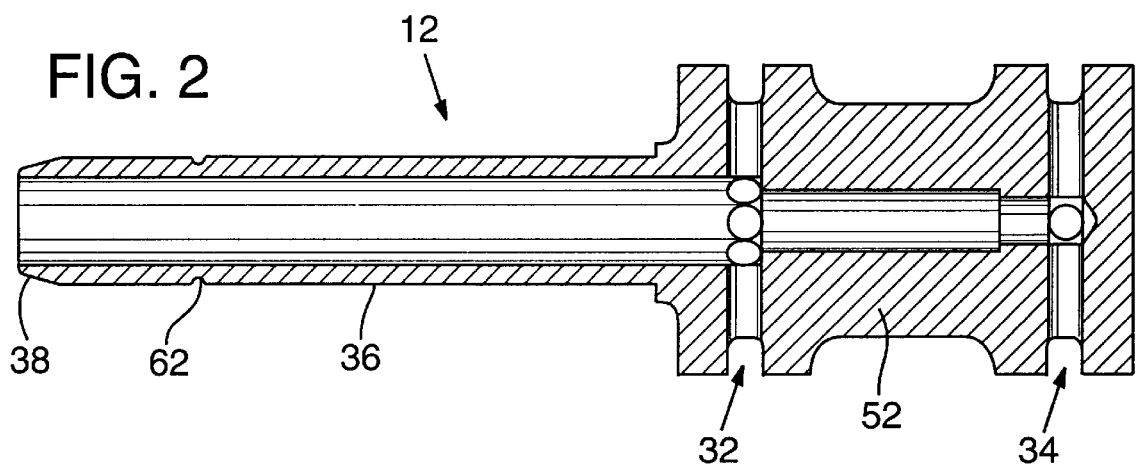
FIG. 2 is a cross-sectional view of the spindle 12 of the engine of FIG. 1.

The circumferential fluid passage 32 in the spool portion 52 of the spindle 12 is in fluid communication with the interior of the extended portion 36 of the spindle 12 via multiple bores extending radially inward from the circumferential fluid passage 32, as shown in FIG. 2 (with one pair of the holes visible in cross-section). The interior surface of the extended portion 36 and the exterior surface of the feed pipe 14 together form an annular conduit for fuel from a fuel inlet 40 as shown in FIG. 1. Seals 42 and 46 seal off a fuel inlet chamber 44 in fluid communication with the fuel inlet 40 and the annular conduit.

The circumferential fluid passage 34 in the spool portion 52 of the spindle 12 is in fluid communication with a center bore of the spool section 52 and, thereby, with the interior of the feed pipe 14, via multiple bores extending radially inward from the circumferential fluid passage 34. The interior of the feed pipe 14 is in fluid communication with an oxidizer inlet 56 formed in an oxidizer feed block 22 fixed to the fuel feed block 20. The oxidizer inlet 56 is sealed from the exterior of the feed pipe 14 by a seal 58.

Figure 3:
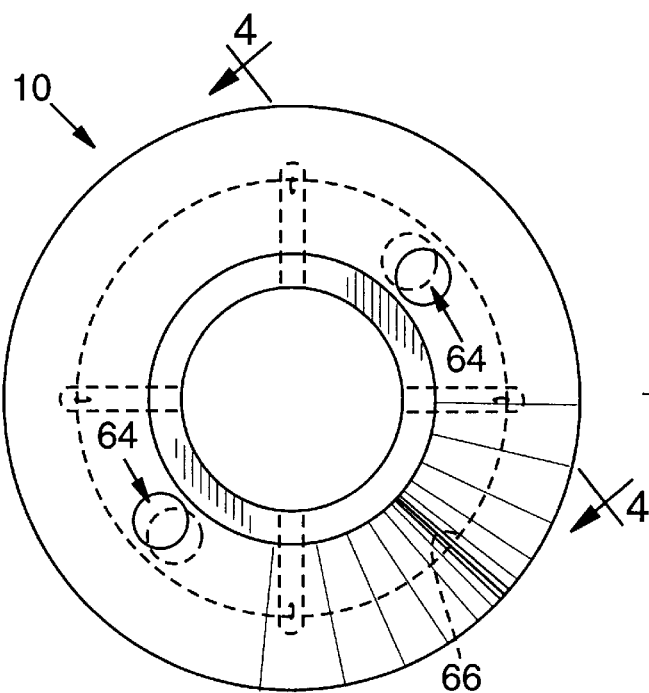
FIG. 3 is an axial plan view of the rotor 10 of the engine of FIG. 1.
Figure 4:
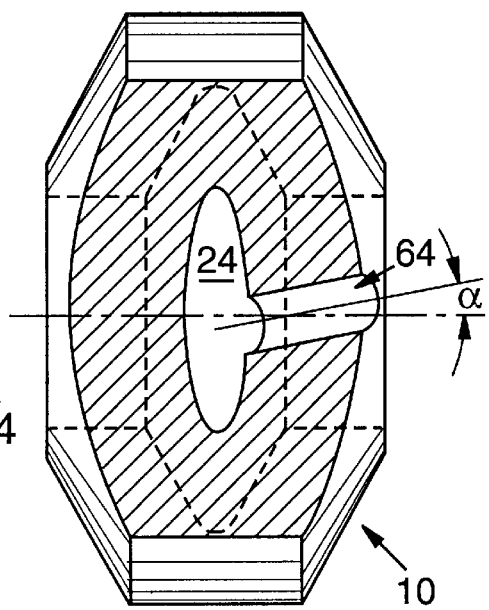
FIG. 4 is a cross-sectional view of the rotor 10 of FIG. 3, taken along the line indicated therein.
Figure 5:
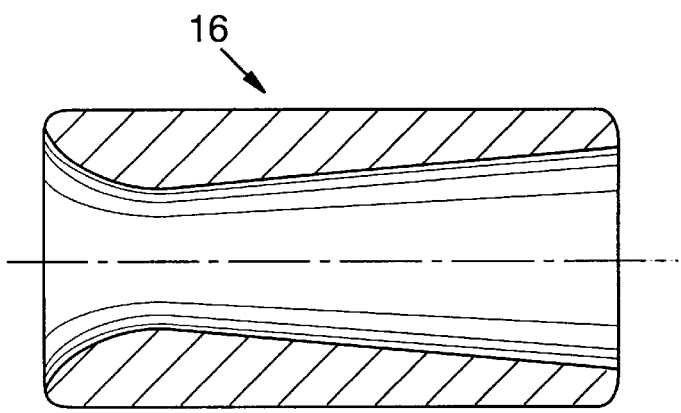
FIG. 5 is a cross section of one of the nozzles 16 of the engine of FIG. 1.

The nozzles 16 in the rotor 10 are fixed within nozzle bores 64 shown in FIG. 3, which is an axial plan view of the rotor 10 of FIG. 1. As shown in FIG. 3, the nozzle bores 64 communicate with the combustion chamber 24 at a point circumferantially offset and radially inward from the injectors 26, and radially inward from the maximum radius 66 of the combustion chamber 24. As shown in FIGS. 3 and 4, the nozzle bores 64 are not parallel with the axis of the rotor 10, but are each tilted, in the circumferential direction, by an angle α (alpha) in the range of about 6 to about 12 degrees, depending upon the desired tangential velocity. An example De Laval nozzle shape for the nozzles 16 is shown in the cross section of FIG. 5. Other types of nozzles may be employed as desired by those of skill in the art.

In operation of the engine of FIG. 1, the tilt of the nozzles 16 provides a tangential component to the primary thrust vectors, such that the rotor assembly rotates during operation of the engine, performing several functions thereby. The tilt angle and other relevant design parameters are selected such that this tangential component is sufficient to rotate the rotor assembly at high speed during operation of the engine, with tangential velocity desirably at least about 200 meters/second, most desirably at least 600 meters/second, at the greatest radius of the rotor assembly. As an alternative, such a tangential thrust component may also be provided by one or more vanes, flutes, or other reaction surfaces on or within an individual nozzle, if desired, such as in a cylindrical combustion chamber with a single nozzle, or in an annular combustion chamber with a spike nozzle, for example.

With the rotation of the rotor assembly, particularly at the relatively high speeds desired, the rotor assembly performs several useful functions.

As one function performed by the rotation of the rotor assembly, the impeller passages 28 and 30 in the rotor 10 (together with the radially inward bores 32 and 34 in the spool portion 52 of the spindle 12) act as a centrifugal pump to pressurize and deliver fuel and oxidizer to the injectors 26. The surfaces that contain the fuel and oxidizer within the extended portion 36 of the spindle 12 (the inner surface of extended portion 36 and the outer and inner surfaces of feed tube 14) act to rotationally accelerate the liquid fuel and oxidizer, reducing the head required to prevent cavitation. In large engines, more or differently-shaped surfaces may be provided within the extended portion to act as inducers to avoid cavitation and to achieve adequate rotational and axial acceleration of the fuel and oxidizer.

Figure 7:
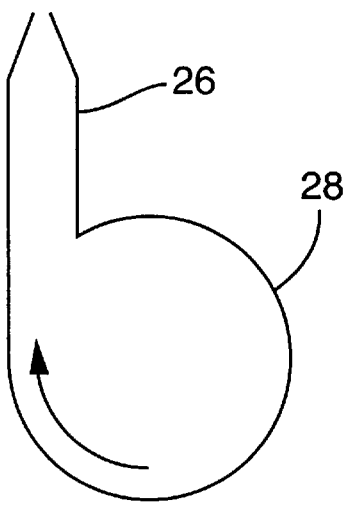
FIG. 7 is a schematic cross-sectional view of an impeller passage and an injector useful in the present invention.

As another function, these same passages also function as cooling passages, allowing heat from the combustion chamber 24 to be regeneratively transferred to the fuel and oxidizer by free and forced convection. As the fuel and oxidizer fluids are pumped radially outward through these passages, particularly at the relatively high speeds desirable in the present invention, the angular momentum of the fluids is increased sufficiently to result in a substantial Coriolis effect in these passages. The Coriolis effect increases the swirl in the passages and reduces the effective thickness of the boundary layer at the passage walls, increasing the cooling capacity beyond that achievable without the Coriolis effect. Optionally, at the inlet for the injectors 26, structures may be imposed to capture some of the angular momentum of this swirl to increase pressurization. For example, the injector bore inlet may enter near the tangent of the impeller channel in opposition to the swirl to maximize the capture of swirl angular momentum for injector pressurization, as shown in FIG. 7.

The centripetal acceleration of the fluid in the cooling/impeller passages is a primary driver of radial and therefore Coriolis flow but also itself tends to decrease the boundary layer and increase cooling capacity. Cryogenic liquid fuel and oxidizer are desirably used, providing high cooling capacity as the desired warming and pumping/pressurization of the cryogenic liquids is performed. Cryogenic temperatures further enhance mass ratio by strengthening otherwise desirable metals, such as aluminum, so that the rotary and static stresses on the rotor 10 can be contained with less mass.

Still another function of the rotating rotor assembly is to provide a rotating combustion chamber 24. The rotating combustion chamber provides at least two particular advantages. First, nozzles 16 are positioned radially inwardly of feel injectors and from the widest radius of the combustion chamber, such that the centripetal acceleration of the rotating fluids in the chamber 24 tends to keep denser fluids, such as unburned and/or cold fuel or oxidizer, in the chamber longer, at the outer portion of the combustion chamber, so that more complete burning and higher $I_{SP}$ may be achieved. Second, because the injectors 26 are positioned radially outward from the nozzles 16, fluids from the injectors must lose angular momentum in traveling from the injectors to the nozzles and out through the nozzles. This results in a Coriolis swirl effect in the combustion chamber, allowing better mixing and longer mixing of the oxidizer and propellant (and greater effective chamber length thereby enhancing mass ratio) for more complete combustion and higher $I_{SP}$. The circumferential offset of the injectors from the nozzles, alone, also assists in providing better and longer mixing for more complete combustion and higher $I_{SP}$. The thus-improved mixing and combustion is potentially less sensitive to injector design, allowing relaxed specification in this typically relatively critical component.

The rotor assembly thus acts as a self-driving pump and rotating combustion chamber, and the impellers or impeller passages of the pump(s) act as high fluid velocity vortex cooling passages for regenerative cooling. These several functions are performed by a single moving part, the rotor assembly, providing a simple and highly efficient method of pressurizing and pumping the fuel and oxidizer, allowing high injector pressures, desirably at least about 4500 psi (for lower density liquids like propane) and at least about 7500 psi (for higher density liquids like LOX) The high cooling capacity achieved in part through centripetal acceleration and the Coriolis effect in the cooling passages potentially allows use of unconventional materials for the combustion chamber and other rotor assembly parts, such as aluminum, (e.g., aluminum 7075-T6, a standard structural aluminum), which has good strength at extremes of low temperature, and excellent heat conduction. Highest performance applications would desirably employ high-strength composites to achieve maximum strength-to-weight ratios in the rotating components, particularly in those with the highest tangential velocities. Suitable composite materials, such as woven or spun carbon fiber in various forms, are known to those of skill in the art.

Liquid oxygen (LOX) and cooled liquid propane (LPG) are desirably employed as the oxidizer and fuel, respectively, in the propulsion system. Other thermally compatible fuel/oxidizer combinations may also be desirable, such LOX and liquid methane. Although LPG is liquid at higher temperatures than LOX, it may be maintained at the same temperature and pressure as LOX, eliminating the need for thermal insulation, simplifying tank design, and allowing both the fuel and the oxidizer to act as coolant fluids, rather than the oxidizer alone. LPG at LOX temperatures has negligible vapor pressure, increasing the available suction head at the LPG pump and thus reducing its tendency toward cavitation. The LOX and cooled LPG thus can both provide cryogenic coolant to the cooling passages surrounding the combustion chamber, providing a large thermal gradient and resultant good cooling capacity. Since both LOX and LPG can be used at the same temperature, no insulation is required in the engine (and pump) thus lightening, strengthening, and simplifying it. This allows a higher velocity and thus a higher developed pressure.

Other fuels are possible, for example, silane, ethane and methane are suitable for use with LOX. Other higher temperature oxidizers and fuels are possible, but they require the use of higher temperature materials, which materials have other tradeoffs, e.g. lower thermal conductivity. Variations of fuels and oxidizers necessitate corresponding temperature and pressure variations in tankage and engines, as understood in the art.

Figure 6:
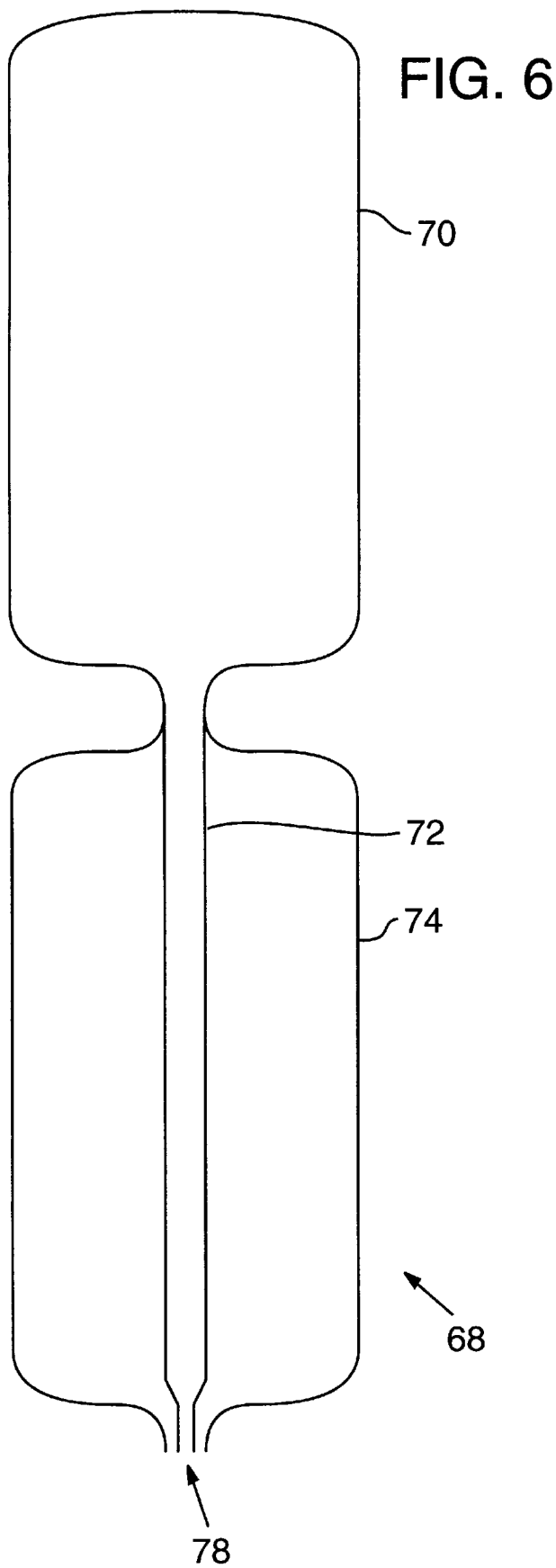
FIG. 6 is a schematic cross-sectional view of a tank useful in the present invention.

A desirable tank design is represented schematically in FIG. 6. The dual tank 68 includes a LOX tank 70 with an outlet pipe 72 that passes concentrically through an LPG tank 74. The feed pipe 72 has a first relatively large diameter except just before a coaxial outlet 78, where the feed pipe 72 narrows. The LPG tank 74 is sealed around the outlet pipe 72 at the upper end, and has an opening surrounding and coaxial with the feed pipe 72 at coaxial outlet 78. The use of LOX and LPG or other thermally compatible fuel and oxidizer combinations avoids the need for any insulation between the fuel and oxidizer, allowing the straightforward coaxial design. With the straight-down, coaxial outlet arrangement, acceleration of the propulsion system, in the direction upward in the figure, can directly and efficiently improve delivery of fuel and oxidizer from the tank.

The tank 68 is desirably formed of PET or other polymer material with good strength and flexibility, relative to its weight and cost, at cryogenic temperatures. Starting pressure in the tanks can be in the range of about 10 psi to about 160 psi, desirably about 30 psi, at temperatures in the range of about 90° K to about 111° K, desirably about 90° K.

The invention has been described herein with reference to particular embodiments, but variations within the spirit and scope of the invention will occur to those skilled in the art. For example, variations in materials, addition of supplemental systems such as ablative cooling, and other variations will occur to those of skill in the art. Accordingly, the scope of the invention is as defined in the appended claims.

We claim:

1. A rocket propulsion system comprising:
   an axial liquid fuel passage;
   a coaxial liquid oxidizer passage enclosed within the liquid fuel passage;
   a pump impeller fluidly connected to the fuel and oxidizer passages and mounted for rotation about the axis of the passages;
   an annular combustion chamber fluidly connected to the pump impeller through injectors that introduce and distribute liquid fuel and oxidizer from the impeller into the combustion chamber; and
   at least one nozzle providing fluid communication between the combustion chamber and the exterior of the propulsion system.

2. The rocket propulsion system of claim 1 wherein the fuel and oxidizer passages have fuel and oxidizer inlets adjacent to each other.

3. The rocket propulsion system of claim 1 wherein the nozzle is positioned radially inward from the injectors and the widest radius of the combustion chamber.

4. The rocket propulsion system of claim 1 further comprising a polymer tank for holding and supplying fuel and oxidizer.

5. The rocket propulsion system of claim 4 wherein the polymer tank is structured to hold and supply fuel and oxidizer at a pressure of at least 10 psi.

6. The rocket propulsion system of claim 4 wherein the polymer tank comprises an upper tank, a lower tank, and a coaxial pipe from the upper tank through the lower tank.

7. The rocket propulsion system of claim 1 further comprising a source of the liquid oxidizer and a source of the liquid fuel, wherein the oxidizer and fuel are stored in adjacent cells lacking mutual dividing insulation but commonly insulated against heat transfer to the environment, the liquid fuel and liquid oxidizer thereby sustained at substantially the same temperature.

8. The rocket propulsion system of claim 1 wherein channels of the pump impeller and the injectors are positioned relative to each other to induce a Coriolis effect during operation of the rocket propulsion system, thereby increasing injector inlet pressures.

9. The rocket propulsion system of claim 1 wherein channels of the pump impeller are shaped to centripetally accelerate the liquid fuel and liquid oxidizer during operation of the rocket propulsion system.

10. The rocket propulsion system of claim 1 wherein channels of the pump impeller are positioned in sufficient proximity to the combustion chamber such that enough heat is transferred from the combustion chamber to the liquid fuel and oxidizer passing through the impeller channels to produce a regenerative convective cooling of the combustion chamber walls during operation of the rocket propulsion system.

11. The rocket propulsion system of claim 1 wherein channels of the pump impeller extend radially outward at an acute angle from a pump impeller axis of rotation, such that enough Coriolis effect swirl is induced on the liquid fuel and oxidizer passing through the impeller channels to reduce the effective thickness of the boundary layer at the passage walls during operation of the rocket propulsion system.

12. The rocket propulsion system of claim 1 wherein surfaces of the axial liquid fuel passage and coaxial liquid oxidizer passage are shaped to rotationally accelerate the liquid fuel and oxidizer.

13. The rocket propulsion system of claim 1 wherein surfaces of the axial liquid fuel passage and coaxial liquid oxidizer passage are shaped to axially accelerate the liquid fuel and oxidizer.

14. A rocket propulsion system comprising:
   an axial liquid fuel passage;
   a coaxial liquid oxidizer passage enclosed within the liquid fuel passage, the fuel and oxidizer passages mounted for rotation about their axis;
   a pump impeller fluidly connected to the fuel and oxidizer passages and mounted for rotation about the axis of the passages;
   an annular combustion chamber fluidly connected to the pump impeller; and
   at least one nozzle providing fluid communication between the combustion chamber and the exterior of the propulsion system.

15. The rocket propulsion system of claim 14, wherein a least one nozzle is configured to generate a tangential thrust component for driving and sustaining rotation of the pump impeller during operation of the propulsion system.

16. A method of delivering fuel and oxidizer to a combustion chamber within a rocket engine comprising:
   providing fuel from a tank into an axial liquid fuel passage within the engine;
   providing oxidizer from a tank into a coaxial liquid oxidizer passage enclosed within the fuel passage; and
   rotating the liquid fuel passage and the liquid oxidizer passage about their axis at a sufficient rate to rotationally accelerate the flow of fuel and oxidizer in the passages toward a combustion chamber within the engine.

* * * * *